Sept. 1, 1959  A. F. CANN  2,902,562
FREQUENCY DOUBLING CHOPPERS
Filed Oct. 14, 1957

Inventor:
Arthur F. Cann
by Robert J. Palmer
Attorney

United States Patent Office 2,902,562
Patented Sept. 1, 1959

2,902,562

FREQUENCY DOUBLING CHOPPERS

Arthur F. Cann, Winchester, Mass., assignor to Stevens-Arnold Inc., a corporation of Massachusetts Application October 14, 1957, Serial No. 689,799

4 Claims. (Cl. 200—90)

This invention relates to electromagnetic vibrators, and relates more particularly to so-called "choppers" which are used to interrupt weak D.C. signals so that they can be changed to A.C. for amplification.

Conventional choppers usually employ a magnetizable core having pole pieces on opposite sides of the free end of a cantilever supported armature reed. A winding on the core has A.C. supplied to it for vibrating the reed, one pole piece attracting and the other pole piece repelling the free end of the reed during alternate half-cycles, and the one pole piece repelling and the other pole piece attracting the free end of the reed during the other half-cycles.

My invention is a frequency-doubling chopper, its armature being caused to vibrate at twice the frequency of the A.C. supplied to the coil on the core which causes it to vibrate. This is accomplished by arranging one of the pole pieces so that it can have no effect except to complete the magnetic circuit. The free end of the armature is attracted to the other pole piece during both half-cycles of the A.C. power. An additional feature aiding this frequency-doubling action is that the armature is mechanically tuned to the doubled frequency. In prior choppers, the frequency of the vibration of their armatures could be increased only by increasing the frequency of the A.C. driving power.

An object of this invention is to provide a frequency-doubler chopper.

Another object of this invention is to arrange the magnetic circuit of a chopper so that its armature vibrates at twice the frequency of the applied A.C. power.

This invention will now be described with reference to the annexed drawings, of which:

Figure 1:
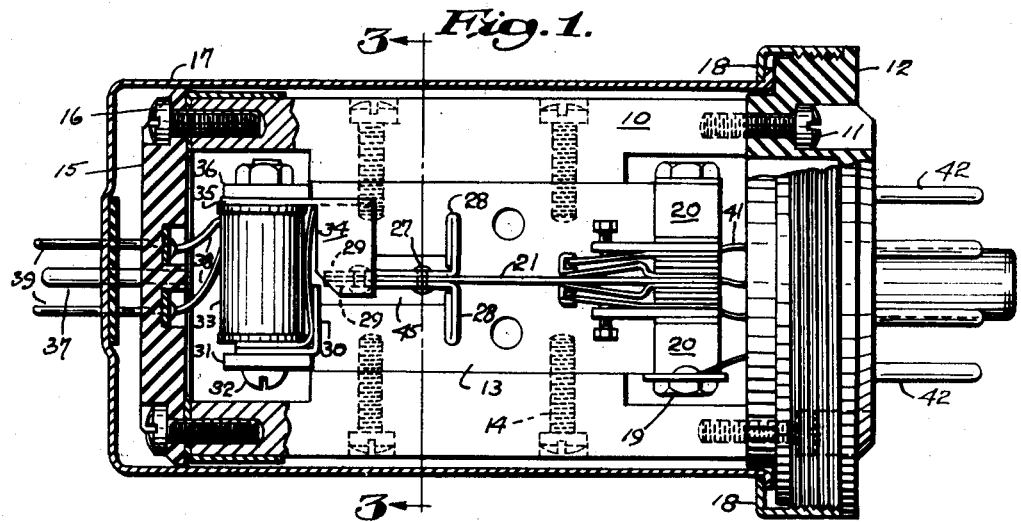
Fig. 1 is a side elevation, partially in section, of a chopper embodying this invention.
Figure 2:
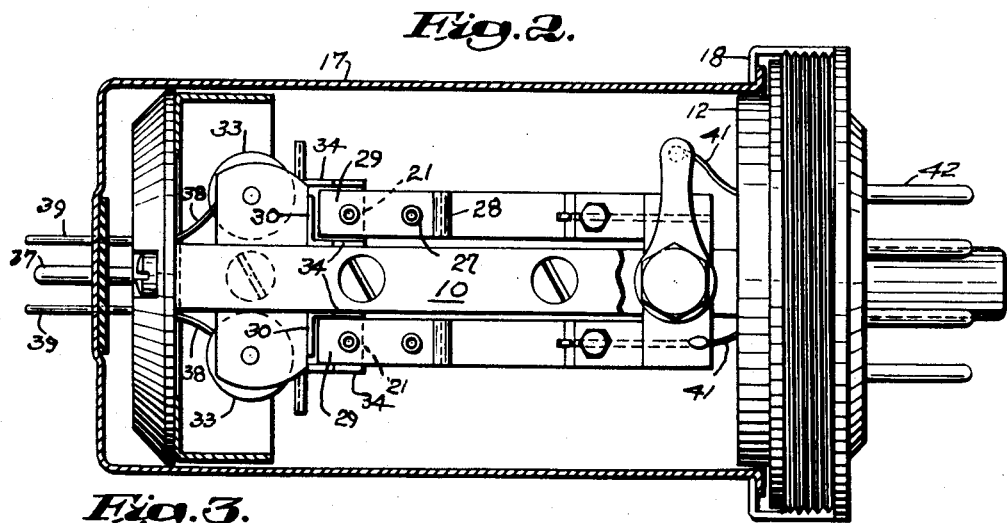
Fig. 2 is a plan view, partially in section, of Fig. 1.
Figure 3:
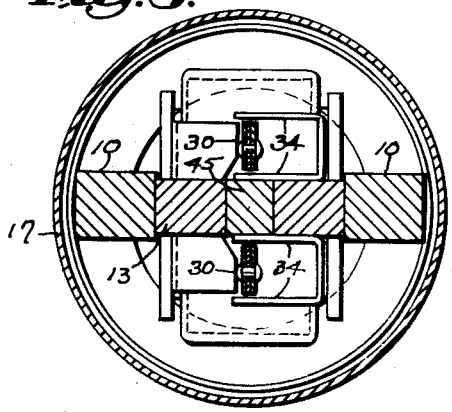
Fig. 3 is a section along the line 3—3 of Fig. 1.

Metal frame bars 10 are attached by screws 11 to a base 12 of electric insulation. A metal chassis plate 13 extends between and is attached by screws 14 to the bars 10. A cover plate 15 of electric insulation is attached to the end of the bars 10 opposite the base 12. A metal shield 17 extends around the bars 10 and the cover plate 15 and is attached to the base 12 by the threaded ring 18.

The plate 13 has secured thereto by a bolt 19 and metal spacers 20, a reed and contact assembly consisting of a pair of reeds 21, contact spring strips 22, one on each side of each reed and in contact therewith, contact spring strips 23, one on each side of each armature 22, metal spacers 23 and strips 24 of electric insulation between the respective strips 22 and 23, metal plates 25 in contact with the strips 23, and spacers 26 of electric insulation between the plates 25 and the spacers 20.

The free end of each reed 21 has secured to opposite sides thereof by staples 27, reed weights 28 which have outer flat, strap portions 29 in contact with opposite sides of the reed 21 and extending outwardly beyond the free ends of the reed 21 to a point adjacent the outer end of a magnetic pole piece 30 which is attached through a metal strap 31 and screw 32 to one end of a core (not shown) of an electromagnet 33, there being two pole pieces 30 and two electromagnets 33, one for the strap portions 29 of each reed. The other pole piece for the strap portions 29 of each reed 21 consists of a U-shaped metal strap 34 straddling the free end of the strap portions 29 with open ends facing the respective pole piece 30. Each strap 34 is a part of a metal strap 33 which is attached through a metal strap 36 and the screw 32 to the other end of the core of the respective electromagnet 30. The air gap between the pole piece 30 and the straps 31 and 36 is common to the two electromagnets and their pole pieces. The screw 32 extends through the adjacent end of the plate 13 and secures the electromagnet assemblies thereto.

The electromagnets 30 have conductors 38 connected to pins 39 which extend through insulating clearance openings (not shown) in the outer end of the shield 17. The enlarged pin 40 is for centering and supporting a socket plugged onto the pins 39.

The reeds 21 and contact plates 25 are connected by conductors 41 to socket pins 42. The plates 25 have screws 43 extending therethrough in contact with the contact strips 23, and serve to adjust the spacing of the strips 23 relative to their associated contact strips 22. The contacts of each reed can be adjusted for make-before-break or break-before-make.

The pole pieces 30 and 34, the straps 31, 35 and 36, the cores of the electromagnets 30, and the reed magnets 28 are of magnetizable metal. The other metal parts preferably are not magnetizable. The armatures are seen to consist of non-magnetizable reeds and magnetizable reed weights. By making the reeds of non-magnetizable metal, the contacts are out of the magnetic field with reduced noise of operation.

The chassis plate 13 opposite the reed weights has a cut-out with a non-magnetizable metal insert 45 therein which has no function as far as the present invention is concerned.

It is apparent from the foregoing description that two separate vibrators are assembled in one envelope. The annexed drawings were made from a production unit of which one vibrator is a chopper and the other vibrator is a synchronous rectifier used with the chopper.

*Operation*

In operation, when A.C. power is applied to an electromagnet 33, during alternate half-cycles its pole piece 30 is N and during the other half-cycles its pole piece 30 is S. During the half-cycles when its pole piece 30 is N, the adjacent ends of the strip portions 29 of the weights 28 have an S pole induced therein and are attracted to and move towards the pole piece 30. At these times there is no repulsion force from the other pole piece 34 acting to move the strap portions 29 towards the pole pieces 30, since each leg of the pole piece 34 can only act to move the strap portion 29 sideways in an opposite direction to the action of the other leg so that the net force tending to move the strap portions 29 sideways is zero. During the other half-cycles when the pole piece 30 is S, the adjacent ends of the strap portions 29 have an N pole induced in them so that they are attracted to and move towards the pole piece 30. At these times the other pole piece 34 has no effect upon this movement of the reed.

Thus, during both half-cycles of the A.C. power, the reed 21 is vibrated so that its frequency is double that of the A.C. power. For aiding this action so that less power is required and so that the interrupted D.C. signal output when the vibrator is used as a chopper, is smoother, the weights 28 are positioned along the reed to tune it to resonance at twice the frequency of the A.C. power.

Figure 4:
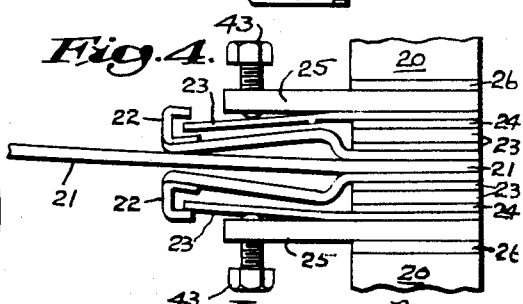
Fig. 4 is an enlarged fragmentary view of the support and contact end of the armature of Figs. 1–3.

As each reed is vibrated, as shown by Fig. 4, it moves one contact strip 22 (the upper) away from its associated contact strip 23, and moves its other contact strip 22 (the lower) against its associated strip 23. These contact members would, if the vibrator is used as a chopper, be connected between a source of weak D.C. signals such as a strain gauge, and an A.C. amplifier.

While the pole pieces 34 have been shown as U-shaped with one leg on each side of the strap portions 29, the pole pieces 34 need not be U-shaped since if a leg of each were omitted, the sideways force exerted by it on the strap portions 29 would be insufficient to move the latter or to effect the frequency doubling action of the pole piece 30.

What is claimed is:

1. An electromagnetic switch comprising a support, an armature attached at one end to said support and having a free end of magnetizable metal, an electromagnet attached to said support, said electromagnet having a first pole piece spaced outwardly from and opposite said free end to form an air gap, and being spaced from one side of said free end when the latter is in its neutral position, said electromagnet having a second pole piece extending alongside said armature from said free end towards said other end and spaced from said armature to form a second air gap at substantially a right angle to said first mentioned air gap, contact means mounted on said support between said second pole piece and said one end of said armature and adapted to be engaged by movement of said armature, and conductors for supplying A.C. to said electromagnet, said free end when said electromagnet is energized, being attracted by said one pole piece and moving from said neutral position alongside of said first pole piece during all half-cycles of said A.C.

2. A switch as claimed in claim 1 in which said armature comprises a reed of non-magnetizable spring metal having one end secured to said support, and having a strap of magnetizable metal extending from its other end towards said first pole piece and forming said free end.

3. A switch as claimed in claim 2 in which said second pole piece is U-shaped and straddles said strap, forming said second air gap on one side of said strap, and forming a third air gap parallel to said second air gap on the opposite side of said strap.

4. A switch as claimed in claim 1 in which said second pole piece is U-shaped and straddles said free end, forming said second air gap on one side of said free end, and forming a third air gap parallel to said second gap on the opposite side of said free end.

References Cited in the file of this patent

UNITED STATES PATENTS

| | | |
|---|---|---|
| 1,671,245 | Kraus | May 29, 1928 |
| 2,445,398 | Huetten | July 20, 1948 |
| 2,675,441 | Side | Apr. 13, 1954 |
| 2,677,027 | Woods | Apr. 27, 1954 |
| 2,790,129 | Barnes | Apr. 23, 1957 |